US012697550B2

(12) United States Patent
Kim et al.

(10) Patent No.: US 12,697,550 B2
(45) Date of Patent: Aug. 4, 2026

(54) APPARATUS FOR PROVIDING CONVERSATION SERVICES AND METHOD THEREOF

(71) Applicant: Hyperconnect LLC, Seoul (KR)

(72) Inventors: Beom Su Kim, Seoul (KR); Su Hyun Lee, Seoul (KR); Sang Bum Kim, Seoul (KR); Enkhbayar Erdenee, Seoul (KR); Jin Yong Yoo, Seoul (KR); Min Chan Kim, Seoul (KR); Yeon Woo Lee, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 304 days.

(21) Appl. No.: 18/493,574

(22) Filed: Oct. 24, 2023

(65) Prior Publication Data

US 2024/0131439 A1    Apr. 25, 2024
US 2024/0226755 A9    Jul. 11, 2024

(30) Foreign Application Priority Data

Oct. 24, 2022    (KR) ........................ 10-2022-0137714
May 10, 2023    (KR) ........................ 10-2023-0060734
Jul. 27, 2023    (KR) ........................ 10-2023-0098306

(51) Int. Cl.
*A63F 13/79*    (2014.01)
*A63F 13/46*    (2014.01)
*G06F 40/35*    (2020.01)
*G06T 7/20*    (2017.01)

(52) U.S. Cl.
CPC ............. *A63F 13/79* (2014.09); *A63F 13/46* (2014.09); *G06F 40/35* (2020.01); *G06T 7/20* (2013.01)

(58) Field of Classification Search
None
See application file for complete search history.

(56) References Cited

U.S. PATENT DOCUMENTS 6,571,234 B1    5/2003    Knight et al.
6,731,307 B1    5/2004    Strubbe et al.
6,735,615 B1    5/2004    Iwayama et al.
(Continued)

FOREIGN PATENT DOCUMENTS

CN    112541060 A    3/2021
JP    2003202885 A    7/2003
(Continued)

OTHER PUBLICATIONS

Extended European Search Report for Application No. 20189677.6, Dated Sep. 28, 2020, 9 pgs.
(Continued)

*Primary Examiner* — Ronald Laneau
(74) *Attorney, Agent, or Firm* — Patent Capital Group

(57) ABSTRACT

Provided is method of providing a conversation service in an electronic apparatus, including receiving a conversation input from a user terminal, identifying conversation history information associated with a user of the user terminal, obtaining score information corresponding to the user based on the conversation input and the conversation history information, obtaining response information based on the conversation input and the conversation history information, and providing the user terminal with at least one of the score information and the response information.

22 Claims, 11 Drawing Sheets

(56) References Cited

U.S. PATENT DOCUMENTS

| | | | | |
|---|---|---|---|---|
| 6,804,647 | B1 | 10/2004 | Heck et al. | |
| 6,804,675 | B1 | 10/2004 | Knight et al. | |
| 7,277,855 | B1 | 10/2007 | Acker et al. | |
| 7,685,237 | B1 | 3/2010 | Weaver et al. | |
| 10,037,342 | B2 * | 7/2018 | Kikuchi | A63F 13/61 |
| 10,176,819 | B2 | 1/2019 | Sun et al. | |
| 10,930,263 | B1 | 2/2021 | Mahyar | |
| 11,553,077 | B2 * | 1/2023 | Todasco | G10L 15/005 |
| 11,615,777 | B2 | 3/2023 | Ahn et al. | |
| 11,645,547 | B2 | 5/2023 | Tian et al. | |
| 12,316,583 | B2 * | 5/2025 | Choi | G06N 3/08 |
| 2002/0120450 | A1 | 8/2002 | Junqua et al. | |
| 2004/0111271 | A1 | 6/2004 | Tischer | |
| 2005/0144247 | A1 | 6/2005 | Christensen et al. | |
| 2006/0149558 | A1 | 7/2006 | Kahn et al. | |
| 2006/0210034 | A1 | 9/2006 | Beadle et al. | |
| 2006/0235932 | A1 | 10/2006 | Celi, Jr. et al. | |
| 2007/0005754 | A1 | 1/2007 | Horvitz et al. | |
| 2007/0071206 | A1 | 3/2007 | Gainsboro et al. | |
| 2008/0082333 | A1 | 4/2008 | Nurminen et al. | |
| 2008/0147385 | A1 | 6/2008 | Nurminen et al. | |
| 2008/0183473 | A1 | 7/2008 | Nagano et al. | |
| 2008/0207242 | A1 | 8/2008 | Ekberg | |
| 2008/0235024 | A1 | 9/2008 | Goldberg et al. | |
| 2009/0037179 | A1 | 2/2009 | Liu et al. | |
| 2009/0171657 | A1 | 7/2009 | Tian et al. | |
| 2009/0177473 | A1 | 7/2009 | Aaron et al. | |
| 2009/0204510 | A1 | 8/2009 | Hwang | |
| 2010/0161327 | A1 | 6/2010 | Chandra et al. | |
| 2012/0189272 | A1 | 7/2012 | Kunigita et al. | |
| 2012/0226500 | A1 | 9/2012 | Balasubramanian et al. | |
| 2013/0332167 | A1 | 12/2013 | Kilgore | |
| 2014/0195227 | A1 | 7/2014 | Rudzicz et al. | |
| 2014/0303958 | A1 | 10/2014 | Lee et al. | |
| 2015/0379654 | A1 | 12/2015 | Deshmukh et al. | |
| 2016/0005403 | A1 | 1/2016 | Agiomyrgiannakis et al. | |
| 2016/0036962 | A1 | 2/2016 | Rand | |
| 2016/0104474 | A1 | 4/2016 | Bunn et al. | |
| 2016/0203827 | A1 | 7/2016 | Leff et al. | |
| 2016/0379643 | A1 | 12/2016 | Ito et al. | |
| 2017/0171509 | A1 | 6/2017 | Huang et al. | |
| 2017/0171599 | A1 | 6/2017 | Peng | |
| 2017/0213007 | A1 * | 7/2017 | Moturu | G16H 20/10 |
| 2017/0249953 | A1 | 8/2017 | Yassa et al. | |
| 2017/0301340 | A1 | 10/2017 | Yassa et al. | |
| 2018/0048865 | A1 | 2/2018 | Taylor et al. | |
| 2018/0063556 | A1 | 3/2018 | Kalmanson et al. | |
| 2018/0090126 | A1 | 3/2018 | Peterson et al. | |
| 2018/0130471 | A1 | 5/2018 | Trufinescu et al. | |
| 2018/0204576 | A1 | 7/2018 | Dhoot et al. | |
| 2018/0316964 | A1 | 11/2018 | Dillon et al. | |
| 2019/0044985 | A1 | 2/2019 | Jo et al. | |
| 2019/0079941 | A1 | 3/2019 | Sarkar et al. | |
| 2019/0221225 | A1 | 7/2019 | Bricklin et al. | |
| 2019/0251952 | A1 | 8/2019 | Arik et al. | |
| 2019/0334842 | A1 | 10/2019 | Sato | |
| 2019/0354594 | A1 | 11/2019 | Foster et al. | |
| 2020/0013422 | A1 | 1/2020 | Matkin | |
| 2020/0082807 | A1 | 3/2020 | Kim et al. | |
| 2020/0097544 | A1 * | 3/2020 | Alexander | G06N 3/0895 |
| 2020/0197810 | A1 | 6/2020 | Kung et al. | |
| 2020/0265829 | A1 | 8/2020 | Liu et al. | |
| 2020/0395008 | A1 | 12/2020 | Cohen et al. | |
| 2021/0043187 | A1 | 2/2021 | Ahn et al. | |
| 2022/0199068 | A1 | 6/2022 | Ahn et al. | |
| 2023/0077528 | A1 | 3/2023 | Erdenee et al. | |
| 2023/0080930 | A1 | 3/2023 | Seo et al. | |
| 2023/0154453 | A1 | 5/2023 | Erdenee et al. | |
| 2023/0215418 | A1 | 7/2023 | Ahn et al. | |
| 2023/0229864 | A1 | 7/2023 | Kim et al. | |
| 2023/0229964 | A1 | 7/2023 | Kim et al. | |

FOREIGN PATENT DOCUMENTS

| | | | |
|---|---|---|---|
| JP | 2019179257 | A | 10/2019 |
| JP | 2020160319 | A | 10/2020 |
| KR | 20000036463 | A | 7/2000 |
| KR | 20010091677 | A | 10/2001 |
| KR | 20090028151 | A | 3/2009 |
| KR | 101632435 | B1 | 6/2016 |
| KR | 20170107683 | A | 9/2017 |
| KR | 20180059322 | A | 6/2018 |
| KR | 20190008137 | A | 1/2019 |
| KR | 20190085882 | A | 7/2019 |
| KR | 10-2170563 | B1 | 10/2020 |
| KR | 10-2173553 | B1 | 11/2020 |
| WO | 2018074516 | A1 | 4/2018 |
| WO | 2019139430 | A1 | 7/2019 |
| WO | 2019222591 | A1 | 11/2019 |

OTHER PUBLICATIONS

Extended European Search Report for Application No. 22189981.8, mailed Jan. 17, 2023, 9 pgs.

Extended European Search Report for Application No. 22207004.7 dated Mar. 9, 2023, 9 pgs.

Japanese Office Action for Application No. 2020-134046 , Dated Sep. 10, 2021, 8 pgs.

Korean Office Action for Application No. 10-2019-0097398, Dated Aug. 18, 2021, 15 pgs.

Korean Office Action for Application No. 10-2019-0097398, Dated Jun. 25, 2020, 11 pgs.

Office Action for Japanese Patent Application No. 2021-083959 dated Sep. 28, 2022, 2 pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005. 14165v4 [cs.CL], Jul. 22, 2020, 75 pgs.

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Choi et al., "Attentron: Few-Shot Text-to-Speech Utilizing Attention-Based Variable-Length Embedding", ArXiv abs/2005.08484, Aug. 12, 2020 (Version 2), 5 pgs.

Choi et al., "Attentron: Few-Shot Text-to-Speech Utilizing Attention-Based Variable-Length Embedding", ArXiv abs/2005.08484, May 18, 2020 (Version 1), 5 pgs.

Cooper et al., "Zero-Shot Multi-Speaker Text-to-Speech with State-of-the-Art Neural Speaker Embeddings", arXiv:1910.10838v2, Feb. 4, 2020, 5 pgs.

Fan et al., "Augmenting Transformers with KNN-Based Composite Memory for Dialog", Transactions of the Association for Computational Linguistics, vol. 9, Mar. 1, 2021, pp. 82-99, https://doi.org/10.1162/tacl_a_00356.

Fu et al., "Stylistic Retrieval-based Dialogue System with Unparallel Training Data", arXiv:2109.05477, Sep. 12, 2021, 9 pgs.

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029.

Guu et al., "REALM: Retrieval-Augmented Language Model Pre-Training", arXiv:2002.08909v1 [cs.CL], Feb. 10, 2020, 12 pgs.

Han et al., "Meet Your Favorite Character: Open-domain Chatbot Mimicking Fictional Characters with only a Few Utterances", arXiv:2204. 10825, Apr. 22, 2022, 19 pgs.

Holtzman et al., "The Curious Case of Neural Text Degeneration", arXiv:1904.09751v2 [cs.CL], Feb. 14, 2020, 16 pgs.

(56)                    References Cited

OTHER PUBLICATIONS

Hsu et al., "Hierarchical generative modeling for controllable speech synthesis", arXiv preprint arXiv:1810.07217v2, Dec. 27, 2018, 27 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lee et al., "Robust and Fine-Grained Prosody Control of End-to-End Speech Synthesis", arXiv:1811.02122v2, Feb. 18, 2019, 5 pgs.

Lewis et al., "Retrieval-Augmented Generation for Knowledge-Intensive NLP Tasks", arXiv:2005.11401v4 [cs.CL], Apr. 12, 2021, 19 pgs.

Li et al., "A Diversity-Promoting Objective Function for Neural Conversation Models", Proceedings of NAACL-HLT 2016, San Diego, California, Jun. 12-17, 2016, pp. 110-119.

Li et al., "Don't Say That! Making Inconsistent Dialogue Unlikely with Unlikelihood Training", arXiv:1911.03860v2 [cs.CL], May 6, 2020, 15 pgs.

Liu et al., "How NOT to Evaluate Your Dialogue System: An Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", arXiv:1809.01984v1 [cs.CL], Sep. 6, 2018, 5 pgs.

Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for building an open-domain chatbot", arXiv:2004.13637v2 [cs.CL], Apr. 30, 2020, 25 pgs.

Serban et al., "Multiresolution Recurrent Neural Networks: An Application to Dialogue Response Generation", arXiv:1606.00776v2 [cs.CL], Jun. 14, 2016, 21 pgs.

Welleck et al., "Neural Text Degeneration with Unlikelihood Training", arXiv:1908.04319v2 [cs.LG], Sep. 26, 2019, 17 pgs.

Weston et al., "Retrieve and Refine: Improved Sequence Generation Models for Dialogue", arXiv:1808.04776v2 [cs.CL], Sep. 6, 2018, 6 pgs.

Wu et al., "Response Generation by Context-aware Prototype Editing", arXiv:1806.07042v4 [cs.CL], Nov. 16, 2018, 9 pgs.

Yang et al., "A Hybrid Retrieval-Generation Neural Conversation Model", arXiv:1904.09068v1 [cs.IR], Apr. 19, 2019, 11 pgs.

Zhang, et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

Zhang et al., "DIALOGPT: Large-Scale Generative Pre-training for Conversational Response Generation", Proceedings of the 58th Annual Meeting of the Association for Computational Linguistics, Jul. 5-10, 2020, pp. 270-278.

* cited by examiner

APPARATUS FOR PROVIDING CONVERSATION SERVICES AND METHOD THEREOF

CROSS-REFERENCE TO RELATED APPLICATION(S)

This application claims the benefit of Korean Patent Application No. 10-2022-0137714, filed on Oct. 24, 2022, Korean Patent Application No. 10-2023-0060734, filed on May 10, 2023, and Korean Patent Application No. 10-2023-0098306, filed on Jul. 27, 2023, in the Korean Intellectual Property Office, the disclosures of which are incorporated herein by reference.

BACKGROUND

1. Field of the Invention

Example embodiments relate to an apparatus of providing a conversation service and a method thereof. More specifically, example embodiments relate to a method including receiving a conversation input from a user terminal, identifying conversation history information associated with a user of the user terminal, obtaining score information corresponding to the user, obtaining response information, and providing the user terminal with at least one of the score information and the response information, and relate to an apparatus using the method.

2. Description of the Related Art

With the development of electronic technology, various electronic services closely related to our daily life are being provided. For example, chatbot services are provided in which interaction between users and the web services takes place when a message is received in response to a user's text or voice and a corresponding response or information is provided, based on technology such as artificial intelligence (AI) and natural language processing.

Chatbots are usefully used in many services. However, in most cases, a chatbot only plays an auxiliary role to solve user's inconvenience related to service use or plays an auxiliary role for a user to actively use a service, and it is rare for a chatbot itself to function as independent content that users can enjoy.

Regard thereto, prior arts such as KR102173553B1 and KR102170563B1 may be referred to.

SUMMARY

An aspect provides an apparatus and a method, which are related to receiving a conversation input from a user terminal, identifying conversation history information associated with a user of the user terminal, obtaining score information corresponding to the user based on the conversation input and the conversation history information, obtaining response information based on the conversation input and the conversation history information, and providing the user terminal with at least one of the score information and the response information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect, there is provided a method of providing a conversation service in an electronic apparatus, including receiving a conversation input from a user terminal, identifying conversation history information associated with a user of the user terminal, obtaining score information corresponding to the user based on the conversation input and the conversation history information, obtaining response information based on the conversation input and the conversation history information, and providing the user terminal with at least one of the score information and the response information.

According to an example embodiment, the electronic apparatus may obtain the score information further based on the response information.

According to an example embodiment, the electronic apparatus may obtain the response information further based on the score information.

According to an example embodiment, the method may further include, based on the conversation input and the conversation history information, obtaining parameter information corresponding to an emotion of a conversation counterpart of the user and the electronic apparatus may obtain the score information and the response information further based on the parameter information corresponding to the emotion.

According to an example embodiment, the obtaining the score information may include providing a set model with the conversation input and an input including the conversation history information, and obtaining an output from the model in response to conversation input and the input including the conversation history information.

According to an example embodiment, the output of the model may be determined according to a manner in which the model is set, and the manner in which the model is set may include a manner related to how learning data for setting the model is labeled.

According to an example embodiment, the method may further include, based on at least one of the response information and the score information, obtaining motion information of an avatar corresponding to the conversation counterpart of the user, and providing the motion information to the user terminal.

According to an example embodiment, the electronic apparatus may obtain the motion information in such a manner that a degree of association between the motion information and the response information is greater than a degree of association between the motion information and the score information.

According to an example embodiment, the method may further include, based on the score information, determining whether to continue a conversation with the user.

According to an example embodiment, the conversation service may include a conversation type game service, and the determining whether to continue the conversation with the user may include determining whether to proceed to a next stage associated with the game service based on the score information.

According to an example embodiment, the conversation history information may include score information corresponding to the user, wherein the score information is previously obtained based on at least one previous conversation.

According to an example embodiment, the method may further include determining whether the conversation input satisfies a set condition, and when the conversation input satisfies the set condition, providing the user terminal with feedback information related to the conversation input, and the electronic apparatus may obtain the score information further based on whether the conversation input satisfies the set condition.

According to an example embodiment, the determining whether the conversation input satisfies the set condition may include at least one of identifying whether the conversation input includes a set keyword and identifying whether the conversation input belongs to a set category.

According to an example embodiment, a method of using the conversation history information to obtain the score information and a method of using the conversation history information to obtain the response information may be different from each other.

According to another aspect, there is provided an electronic apparatus of providing a conversation service, including a transceiver, a memory configured to store instructions and a processor, wherein the processor, connected to the transceiver and the memory, is configured to receive a conversation input from a user terminal, identify conversation history information associated with a user of the user terminal, obtain score information corresponding to the user based on the conversation input and the conversation history information, obtain response information based on the conversation input and the conversation history information, and provide the user terminal with at least one of the score information and the response information.

Additional aspects of example embodiments will be set forth in part in the description which follows and, in part, will be apparent from the description, or may be learned by practice of the disclosure.

According to example embodiments, it is possible to provide an apparatus and a method for a conversation service which relate to obtaining score information based on conversation contents with a user and providing the score information to a user terminal, and thus the conversation service allows the user to simulate the reaction and emotion of the conversation counterpart according to the progress of the conversation.

Further, according to example embodiments, it is possible to provide a conversation service that satisfies the user's desire to communicate with others and provides positive emotions such as pleasure to the user.

Further, according to example embodiments, it is possible to provide a conversation service that provides a highly realistic conversation experience to a user by adaptively determining the attitude and a response of a conversation counterpart based on conversation history information with the user.

Effects of the present disclosure are not limited to those described above, and other effects may be made apparent to those skilled in the art from the following description.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 3 is a diagram for explaining an operation in which an electronic apparatus generates score information and response information based on a conversation input and conversation history information according to an example embodiment;

DETAILED DESCRIPTION

Figure 1:
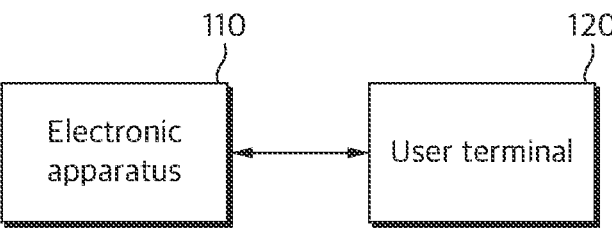
FIG. 1 is a schematic configuration diagram illustrating a system for providing a conversation service according to an example embodiment.

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication apparatus ensuring portability and mobility, and include (but is not limited to) any type of handheld wireless communication apparatus, for example, a tablet PC, a smartphone, a communication-based terminal such as international mobile telecommunication (IMT), code division multiple access (CDMA), W-code division multiple access (W-CDMA), long term evolution (LTE), or the like.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Hereinafter, example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and completely inform the scope of the present disclosure to those of ordinary skill in the art to which the present disclosure pertains. The present disclosure is only defined by the scope of the claims. Like reference numerals refer to like elements throughout.

In this case, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

FIG. 1 is a schematic configuration diagram illustrating a system for providing a conversation service according to an example embodiment.

According to various example embodiments, a system for providing a conversation service includes an electronic apparatus 110 and a user terminal 120. A system for providing a conversation service according to an example embodiment may further include a network that supports information transmitting and information receiving among at least some of the electronic apparatus 110, the user terminal 120 and external apparatuses.

The electronic apparatus 110 and the user terminal 120 of the system for providing the conversation service may include a transceiver, a memory and a processor. Further, each of the electronic apparatus 110 and the user terminal 120 indicates a unit that processes at least one function or operation, and may be implemented in hardware or software, or a combination of hardware and software.

Further, through the example embodiments, the electronic apparatus 110 and the user terminal 120 are referred to as separate apparatuses and servers, but may be logically divided structures. Through the example embodiments, the electronic apparatus 110 and the user terminal 120 may be implemented by separate functions in one apparatus or server. For example, the user terminal 120 may include the electronic apparatus 110 or may be integrally configured by being combined with the electronic apparatus 110. However, even in this case, a method of providing a series of conversation services performed by transmitting data and receiving data between the electronic apparatus 110 and the user terminal 120 may be performed similarly. For example, in the case of an apparatus that includes the electronic apparatus 110 or an apparatus integrated with the electronic apparatus 110, communication of the electronic apparatus 110 may be understood as a process of exchanging data between its elements (for example, a processor of the corresponding apparatus) inside the apparatus.

According to an example embodiment, the electronic apparatus 110 and the user terminal 120 may include a plurality of computer systems or computer software implemented as a network server. For example, at least one of the electronic apparatus 110 and the user terminal 120 may refer to a computer system and computer software that are connected to a sub-apparatus that communicates with other network servers through a computer network such as an intranet or the Internet, and receive requests for performing tasks and perform actions on the requests and provide the results of the actions. In addition, at least one of the electronic apparatus 110 and the user terminal 120 may be understood as a broad concept including a series of application programs that can operate on a network server and various databases built therein. For example, at least one of the electronic apparatus 110 and the user terminal 120 may be implemented using network server programs provided in various ways according to an operating system such as DOS, Windows, Linux, UNIX and MacOS.

As an apparatus that obtains, constructs and provides various information, the electronic apparatus 110 may provide a conversation service through providing various information. Specifically, the electronic apparatus 110 receiving the conversation input from the user terminal 120 may identify conversation history information associated with the user, and the electronic apparatus 110 may obtain score information and response information corresponding to the user based on the conversation input and the conversation history information. With regard thereto, the electronic apparatus 110 may obtain the score information and the response information together, obtain the score information first, or obtain the response information first. Whether the operations are simultaneous or not, and the precedence relationship may be determined in various ways.

The electronic apparatus 110 may provide at least one of the score information and the response information to the user terminal 120. As such, a conversation may be established by receiving a conversation input from the user terminal 120 and providing at least one of score information and response information to the user terminal 120 in response thereto. Further, according to an example embodiment, at least one of a conversation input, the score information and the response information may be further included in the conversation history information, and specific operations such as receiving a conversation input, providing score information and providing response information may be further included in the conversation history information, and accordingly, the conversation input, the score information and the response information may affect the progress of the conversation afterwards.

In addition to the above described operations, according to an example embodiment, the electronic apparatus 110 may perform at least some of various operations according to logic that determines whether the conversation input satisfies a set condition, logic that determines whether the response information satisfies the set condition, logic for obtaining avatar motion information and logic to obtain the user's parameter formation corresponding to emotion of a conversation counterpart. The operations will be described later.

The user terminal 120 may provide information received from the electronic apparatus 110 to the user, and may receive an input from the user and transmit the input information to the electronic apparatus 110. The information that the user terminal 120 received from the electronic apparatus 110 may include the score information and the response information. The input received from the user may include the conversation input, but the input is not limited thereto. Further, the input received from the user may include various types of inputs, such as a click using a mouse, a touch using a touch pad or a touch screen, voice recognition and other electronic inputs.

The user terminal 120 may display additional information on the screen based on the information received from the electronic apparatus 110 or delete at least some of the information displayed on the screen. Further, the electronic apparatus 110 may change a specific display method (for example, a specific configuration of a screen) even when maintaining previously di splayed information.

The user terminal 120 may receive inputs and information from various subjects other than the electronic apparatus 110 and the user, and may perform operations based thereon. For example, the user terminal 120 may provide a user's conversation input to the conversation monitoring apparatus and receive a result of determination as to whether the conversation input satisfies a set condition.

More details related to the operation of the electronic apparatus 110 and the user terminal 120 will be described later with reference to FIGS. 2 to 10.

Operations related to a series of methods for providing the conversation service according to various example embodiments may be implemented by a single physical apparatus, or may be implemented in a manner in which a plurality of physical apparatuses are organically combined. For example, some of the elements included in a system providing a conversation service may be implemented by any one physical apparatus, and some of the others may be implemented in other physical apparatuses. For example, some of the physical apparatuses may be implemented as parts of the electronic apparatus 110, and some of the other physical apparatuses may be implemented as parts of the user terminal 120 or parts of other external apparatuses. In some cases, each of the elements included in the system for providing a conversation service may be implemented to perform functions and operations of the system for providing the conversation service by each of the elements being distributed and arranged in different physical apparatuses and the distributed elements being organically combined. For example, the electronic apparatus 110 of the present disclosure includes two or more sub-units, and some operations described as being performed by the electronic apparatus 110 may be performed by a first sub-unit, and some other operations may also be performed by a second-sub-unit. Further, the user terminal 120 of the present disclosure includes a plurality of sub-apparatuses associated with different users (specifically in the case of a conversation service in which a plurality of users participate together), and operations described as being performed by the user terminal 120 may be divided and performed by a plurality of sub-apparatuses.

Figure 2:
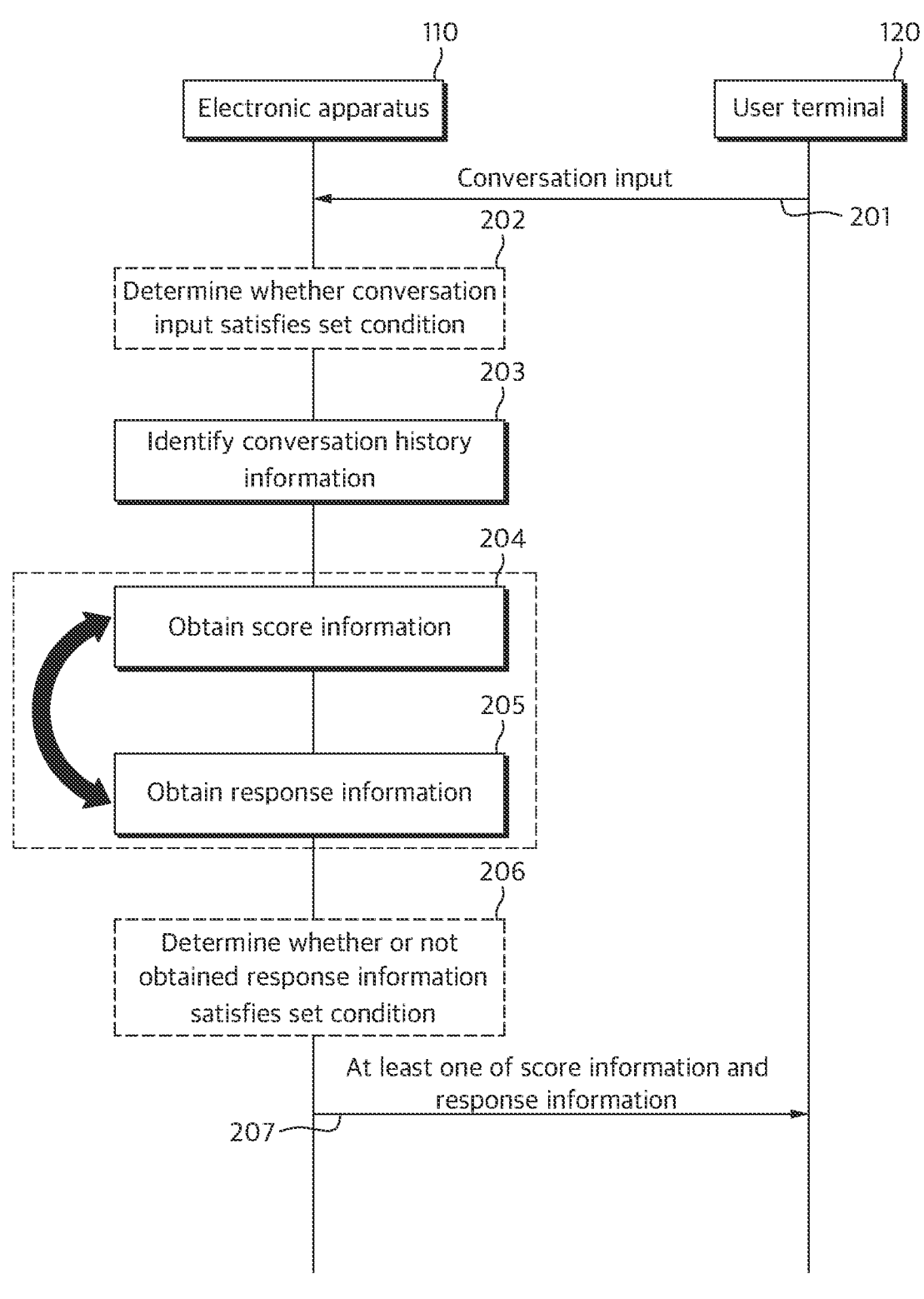
FIG. 2 is a diagram for explaining a method of providing a conversation service by an electronic apparatus according to an example embodiment.

FIG. 2 is an operation flowchart of a method for providing a conversation service of an electronic apparatus in a system for providing a conversation service according to an example embodiment.

Referring to FIG. 2, in operation 201, the electronic apparatus 110 according to the example embodiment receives a conversation input from the user terminal 120. The conversation input may include a user's input for selecting one or more of a plurality of conversation options displayed on the terminal. Further, the conversation input may include a text input by the user for a conversation.

According to an example embodiment, the electronic apparatus 110 may mix a dialog method that provides dialog options to the user and allows the user to select one of them, and a dialog method that allows the user to directly input desired content. For example, the electronic apparatus 110 may provide conversation options to the user for 3 opportunities out of 10 conversation opportunities, and allow the user to directly input desired content for 7 conversation opportunities. Through the mixed use of both methods, the electronic apparatus 110 may prevent the conversation from flowing in an excessively wrong direction while guaranteeing a certain degree of freedom to the user.

According to an example embodiment, even in the absence of an explicit input from the user, the electronic apparatus 110 may understand the situation itself without an explicit input as the user's response to the conversation counterpart, and based thereon, the electronic apparatus 110 may obtain score information and response information. According to an example embodiment, "the absence of an explicit input from the user" may include a case in which no explicit input is received from the user until a set time elapses from the time of receiving the previous conversation input or the time that the just previous response information is provided.

With regard thereto, the electronic apparatus 110 according to an example embodiment may determine "the absence of an explicit input from the user" itself as a kind of conversation input. In this case, the operation of receiving a conversation input, which is operation 201, may be understood as including an operation of identifying that there is no explicit input from the user.

According to an example embodiment, in operation 202, the electronic apparatus 110 may further determine whether the conversation input satisfies a set condition. With regard thereto, if the conversation input satisfies the set condition, the electronic apparatus 110 may provide feedback information related to the conversation input to the user terminal 120. For example, the electronic apparatus 110 may determine whether the set condition is satisfied based on whether the conversation input is abusive or unsafe, and if the conversation input is abusive or unsafe (in other words, if the conversation input satisfies the set condition), the electronic apparatus 110 may provide the user terminal 120 with feedback information, such as a correction request related to a corresponding conversation input.

More specifically with respect to whether the set condition is satisfied, according to an example embodiment, the electronic apparatus 110 may determine that the set condition is satisfied when the received conversation input is related to a preset phrase. For example, if the conversation input relates to the phrase "I want to commit suicide," the electronic apparatus 110 may determine that the conversation input satisfies the set condition.

According to an example embodiment, the electronic apparatus 110 may determine that the conversation input satisfies the set condition if the received conversation input includes a set keyword. For example, if the conversation input includes the keyword "suicide," the electronic apparatus 110 may determine that the corresponding conversation input satisfies the set condition.

According to an example embodiment, the electronic apparatus 110 may identify a category to which the received conversation input belongs, and if the conversation input belongs to a set category (for example, a category of sex, a category of hatred, a category of insult, a category of profanity and a category of politics), the electronic apparatus 110 may determine that the conversation input satisfies the set condition.

According to an example embodiment, if the conversation input is abusive or unsafe, the electronic apparatus 110 may provide the response information based on preset rules. For example, if the conversation input corresponds to a preset phrase, the electronic apparatus 110 may obtain and provide response information including a preset answer phrase corresponding to the phrase. For example, receiving a conversation input saying "I want to commit suicide," the electronic apparatus 110 may obtain and provide response information such as "If you have difficulties, call 1393." which is a preset response phrase.

For another example, if the conversation input belongs to a specific category, the electronic apparatus 110 may provide a fallback answer corresponding to the category. For example, when receiving an conversation input belonging to the category of sex, the electronic apparatus 110 may obtain and provide response information such as "Please refrain from sexual conversation." as a countermeasure.

According to an example embodiment, the electronic apparatus 110 may obtain score information further based on whether the conversation input satisfies a set condition (an operation of obtaining score information will be described later with reference to operation 204). For example, if a conversation input is determined as abusive or unsafe, the electronic apparatus 110 may assign a low score (regarding likeability level).

In operation 203, the electronic apparatus 110 identifies conversation history information related to the user. The conversation history information may include a history of conversations exchanged between the user and the conversation counterpart (a virtual counterpart that utters the response information obtained by the electronic apparatus 110) on the conversation service provided by the electronic apparatus 110, but the conversation history information is not limited thereto. For example, the conversation history information identified by the electronic apparatus 110 may include various types of conversation contents according to example embodiments, such as a conversation history between a counselor related to providing the service and a user.

The conversation history information may include the contents of conversations associated with the user, but according to an example embodiment, the conversation history information may include score information corresponding to a user, wherein the score information is previously obtained based on at least one previous conversation. As such, if the conversation history information includes the score information, scores accumulated as a result of previous conversations (for example, reflecting likeability level) may more directly affect the current conversation content.

Further, the electronic apparatus 110 may identify the entire conversation history associated with the user, but according to an example embodiment, the electronic apparatus 110 may selectively identify some of the conversation histories (for example, a set number of recent conversation inputs and response information). As such, by selectively identifying conversation history for score information and response information, the electronic apparatus 110 may prevent an excessively high computational load for providing a conversation service according to the example embodiments.

In operation 204, based on the conversation input and the conversation history information, the electronic apparatus 110 obtains score information corresponding to the user. Further, in operation 205, based on the conversation input and the conversation history information, the electronic apparatus 110 obtains response information for the received conversation input. The score information may include information obtained by scoring emotions and likeability level that the conversation counterpart feels in relation to the user's conversation input. The response information may include content uttered by the conversation counterpart that identified (a wide range of operations for receiving information, such as listening or reading, may be included) the conversation input of the user.

As described above, the electronic apparatus 110 may obtain score information and response information together, may obtain score information first, or may obtain response information first. Simultaneousness and precedence of the operations may be determined in various ways. Therefore, it is only for convenience of explanation that obtaining the score information corresponds to operation 204 and obtaining the response information corresponds to operation 205, and the present disclosure should not be construed as being limited in that the score information obtainment is performed prior to the response information obtainment.

Further, the order of overall operations in FIG. 2 is not limited by the order of the operations illustrated in FIG. 2. For example, after identifying the conversation history information (corresponding to operation 203 of FIG. 2), it may be determined whether the conversation input satisfies a set condition (corresponding to operation 202 of FIG. 2). Accordingly, the order of operations described in the present disclosure may be variously determined.

According to an example embodiment, the electronic apparatus 110 may obtain at least one of the score information and the response information by providing an input including the conversation input and the conversation history information (the input may further include other information depending on an example embodiment) to the set model and by obtaining outputs from the model that is set in response to the input provided. The "set" model may include "learned" AI models based on learning data. However, in the present disclosure, the model used to obtain at least one of score information and response information is not limited to an AI model, nor is the set model limited to a learned model. For example, "a model in which a plurality of keywords are preset and a response to be output for each corresponding keyword is preset" may also be understood as an example of a set model.

The output of the model may be determined according to a manner in which the model is set. More specifically, depending on how models are set up, outputs of the models for the same input may be different. For example, depending on how the learning data for an AI model is labeled, an output of the AI model may vary. As a specific example, for each of a case when a model learns the learning data that labels favorable responses to the conversation input "It's nice weather" and a case when the model learns the learning data that labels unfavorable responses to the conversation input "It's nice weather," score information to be output when the models receive a similar conversation input may be different from each other (the same is true even in the case of the response information).

According to an example embodiment, the set model may include hardware or software elements operating inside the electronic apparatus 110, and may include hardware or software elements that operate outside the electronic apparatus 110. When the set model operates outside the electronic apparatus 110, a network may be used so that the electronic apparatus 110 provides inputs (such as a conversation input and an input including the conversation history information) to the model and obtains output values from the model. However, when the set model operates inside the electronic apparatus 110, operations in which the electronic apparatus 110 providing a conversation input and an input including conversation history information to the model and obtaining output values from the model may be understood as operations for exchanging data within the electronic apparatus 110.

Meanwhile, depending on an example embodiment, in addition to physically existing hardware or software elements, the set model may be understood as a conceptual element for more conveniently explaining the obtainment process of score information or response information. In this case, the operations described as being performed by the model may actually be performed by the processor of the electronic apparatus 110. Accordingly, there may be various example embodiments related to the present disclosure.

Figure 3:
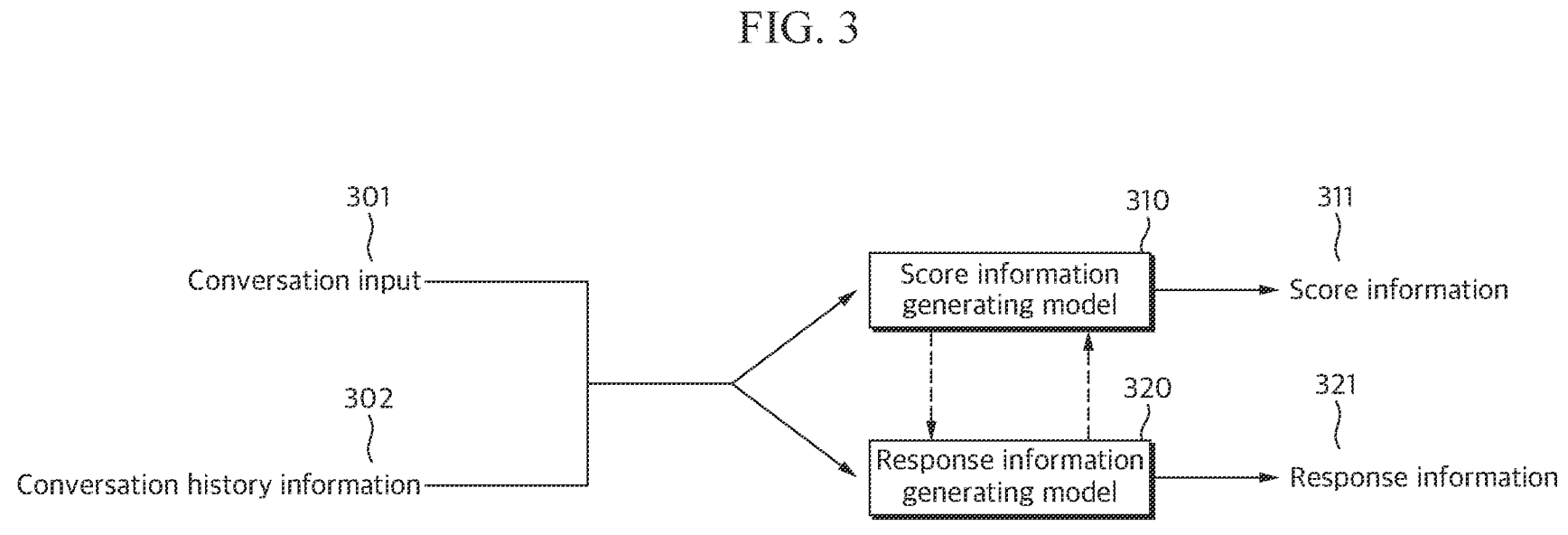

FIG. 3 illustrates operations of obtaining score information and response information using a set model. Referring further to FIG. 3, when a conversation input 301 and conversation history information 302 are input to a score information generating model 310, score information 311 may be output, and when the conversation input 301 and the conversation history information 302 are input to a response information generating model 320, response information 321 may be output.

According to an example embodiment, the electronic apparatus 110 may obtain score information further based on the response information. For example, with regard to FIG. 3, the response information 321 output from the response information generating model 320 may be further input to the score information generating model 310 to output the score information 311. Further, according to an example embodiment, the electronic apparatus 110 may obtain response information further based on the score information. For example, with regard to FIG. 3, the score information 311 output from the score information generating model 310 may be further input to the response information generating model 320 to output the response information 321.

The response information generating model 320 according to an example embodiment obtains response information based on what value the score information 311 has, and accordingly, in the course of a conversation between a user and a conversation counterpart, likeability level (an example of the score information) builds up and a relationship develops, and thus provided to the user is the experience that the conversation counterpart responds more positively and favorably. Further, depending on the change in likeability level, the user may be provided with an experience in which the conversation counterpart's tone and personality change flexibly.

The score information generating model 310 according to an example embodiment may provide scores such as likeability level by reflecting the conversation result (depending on an example embodiment, only the user's conversation input may be included, or a conversation counterpart's response may be further included) of the current turn. With regard thereto, the score information generating model 310 according to an example embodiment may include a regression model that maps a conversation result of a current turn to a numerical value between $-1$ and 1, but the scope of the present disclosure is not limited thereto.

A more specific example embodiment of obtaining score information further based on response information will be described later with reference to FIG. 4. A more specific example embodiment of obtaining response information further based on score information will be described later with reference to FIG. 5.

In addition to the case where the response information 321 is input to the score information generating model 310 or the score information 311 is input to the response information generating model 320, various example embodiments of transmitting and receiving information between the response information generating model 320 and the score information generating model 310 may exist, and the scope of the present disclosure is not limited to the specific example embodiments.

Further, described for convenience of explanation is an example embodiment in which the score information generating model 310 and the response information generating model 320 are present, but the presence of one model does not necessarily lead to the presence of the others (for example, even if the score information generating model 310 is present, the response information generating model 320 may be not present, and vice versa). Further, the score information generating model 310 and the response information generating model 320 may be substantially implemented as one integrated model. In this case, the operation of transmitting and receiving information between the response information generating model 320 and the score information generating model 310 may be understood as a data exchange operation within the model.

Referring back to FIG. 2, both obtaining score information in operation 204 and obtaining response information in operation 205 are described as obtaining information "based on a conversation input and conversation history information," but specific information considered to obtain the score information and specific information considered to obtain the response information do not necessarily have to match. For example, the electronic apparatus 110 may obtain score information by using a conversation (combination of conversation input received from the user and response information obtained and provided by the electronic apparatus 110) during one previous turn (the conversation input received this time and the response information obtained this time are excluded), and in order to obtain response information, conversations during the previous 5 turns may be used.

According to an example embodiment, in operation 206, the electronic apparatus 110 may further determine whether or not the obtained response information satisfies a set condition. With regard thereto, when the response information satisfies the set condition, the electronic apparatus 110 may delete the corresponding response information, and perform an operation of obtaining response information again. Alternatively, the electronic apparatus 110 may delete a problematic part (for example, a key part satisfying the set condition) from the response information that satisfies the set conditions, and retain the rest.

Regarding the type of response information that satisfies the set condition, descriptions related to the conversation input that satisfies the above described set condition may be applied. However, the set condition related to the response information does not necessarily have to match the set condition related to conversation input. For example, when the user's conversation input includes the keyword "suicide," it may be determined that the set condition is satisfied, but when the response information such as "Please do not commit suicide." is obtained in response to a conversation input including the keyword "suicide," it may not be determined that the response information satisfies the set condition just because the keyword "suicide" is included.

In operation 207, the electronic apparatus 110 provides the user terminal 120 with at least one of the score information and the response information. The user may identify the reaction of the conversation counterpart according to the user's conversation input based on the score information and the response information, and furthermore, the user may generally simulate the reaction and emotion of the conversation counterpart according to the progress of series of conversations. Further, in addition to the score information and the response information, the electronic apparatus 110 may generate and provide avatar motion information, or the electronic apparatus 110 may determine whether or not to continue a conversation with the user and provide information about a result of the determination, and accordingly the electronic apparatus 110 may further provide various types of information, which will be described later in FIGS. 4, 8 and 9.

Figure 4:
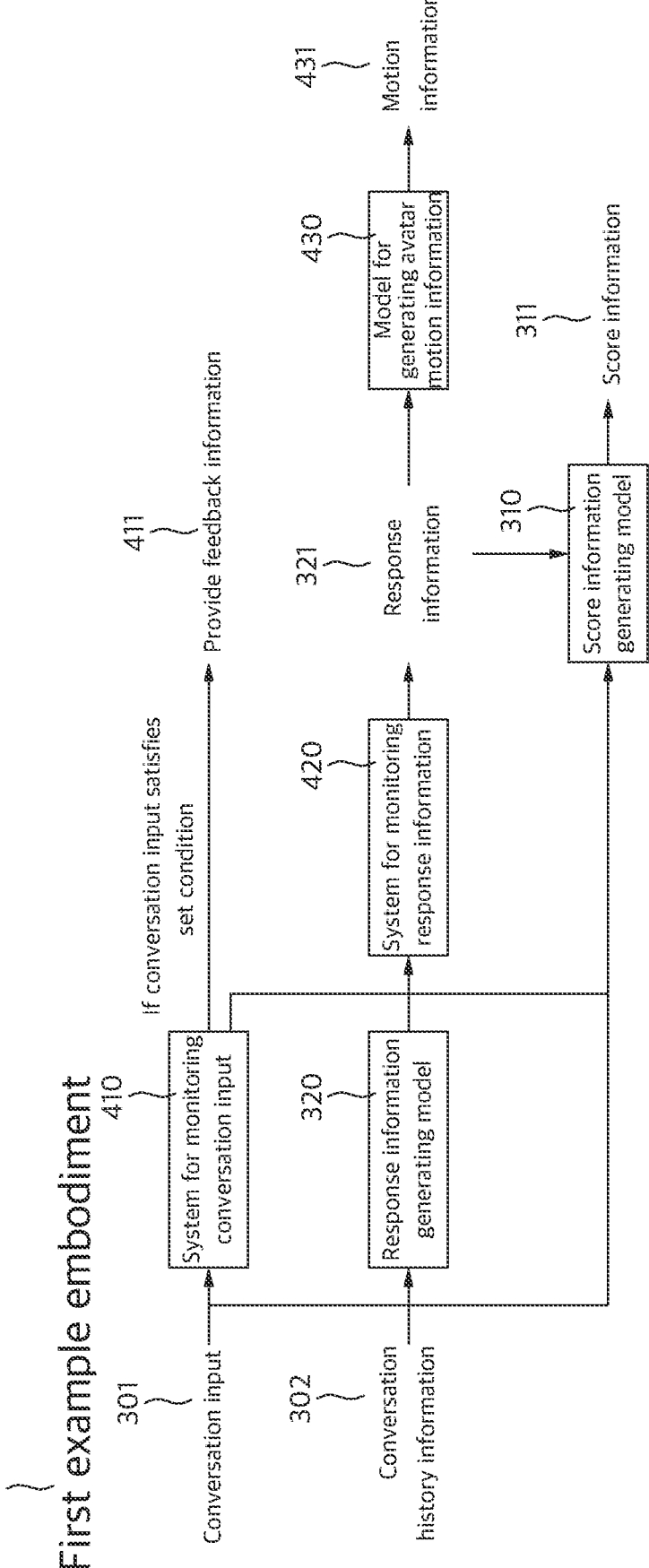
FIG. 4 is a diagram for explaining a first example embodiment related to a method for providing a conversation service by an electronic apparatus according to an example embodiment.

FIG. 4 is a diagram for explaining a first example embodiment related to a method for providing a conversation service by an electronic apparatus according to an example embodiment.

FIG. 4 illustrates a first example embodiment 400 according to the example embodiment. The first example embodiment 400 may correspond to an example embodiment of obtaining the score information 311 based on the response information 321, and this may be more clearly understood by referring to the arrow pointing from reference numeral 321 to reference numeral 310 in FIG. 4.

According to the first example embodiment 400, in operation 411, when the conversation input 301 is input to a system 410 for monitoring conversation input and the conversation input satisfies the set condition as a result of the determination of the system 410 for monitoring conversation input, the electronic apparatus 110 may provide feedback information. The system 410 for monitoring conversation input may correspond to the above described conversation monitoring apparatus or include the above described conversation monitoring apparatus. Alternatively, the system 410 for monitoring conversation input may be an internal element of the electronic apparatus 110 or a conceptual element for more conveniently describing the operation of the electronic apparatus 110. In this case, the operation of the system 410 for monitoring conversation input may correspond to an operation of the electronic apparatus 110, and the input and output of the system 410 for monitoring conversation input may be understood as corresponding to a process of data exchange inside the electronic apparatus 110 (operation 202 may be referred to).

According to an example embodiment, the output of the system 410 for monitoring conversation input may be input to the score information generating model 310, and accordingly, the electronic apparatus 110 may obtain score information further based on whether the conversation input satisfies a set condition. For example, if the conversation input is determined to be abusive or unsafe, the electronic apparatus 110 may give a low score (regarding likeability level).

Further, according to an example embodiment, the conversation history information 302 may be input to the system 410 for monitoring conversation input, or the conversation history information 302 may not be input to the system 410 for monitoring conversation input, and the scope of the present disclosure is not limited thereto.

According to the first example embodiment 400, the electronic apparatus 110 may input the output of the response information generating model 320 to a system 420 for monitoring response information, and if the output of the response information generating model 320 does not satisfy the set condition as a result of the determination of the system 420 for monitoring response information, the electronic apparatus 110 may determine the corresponding output as a problem-free response and determine it as the response information 321. The system 420 for monitoring response information may correspond to a separate external apparatus distinct from the electronic apparatus 110, or may include an external apparatus. Alternatively, the system 420 for monitoring response information may be an internal element of the electronic apparatus 110 or a conceptual element for more conveniently describing an operation of the electronic apparatus 110. In this case, the operation of the system 420 for monitoring response information may correspond to an operation of the electronic apparatus 110, and the input and output of the system 420 for monitoring response information may be understood as a process of exchanging data within the electronic apparatus 110 (operation 206 may be referred to).

According to an example embodiment, the response information generating model 320 may output a plurality of candidate responses, the candidate responses may be input to the system 420 for monitoring response information, and the system 420 for monitoring response information may filter at least some of the candidate responses. For example, the system 420 for monitoring response information may filter and exclude a plurality of candidate responses satisfying a set condition and output the remaining candidate responses. Alternatively, the system 420 for monitoring response in formation may obtain and compare fitness values for each candidate response, and output candidate responses (or, a predetermined number of candidate responses in the order of having the highest fitness value) having the highest fitness value.

Further, as such, when the response information generating model 320 outputs a plurality of candidate responses, an operation for determining which of the candidate response is to be used as the final response information 321 may be further performed. The operation may be performed by the electronic apparatus 110, by the system 420 for monitoring response information, or by other external apparatuses. Thus, the subject of the operation does not limit the score of the present disclosure.

There are some differences in the description in that while it is described "the electronic apparatus 110 may further determine whether or not the obtained response information satisfies a set condition" in operation 206, it is described with respect to the case of FIG. 4 that it is determined whether the output of the system 420 for monitoring response information satisfies a set condition, and if the output does not satisfy the set condition (in other words, if there is no problem with the output), the output is determined as the response information 321. However, even in the case of operation 206, if the response information satisfies the set condition, the response information may be deleted and new response information may be re-obtained; or, a part of the response information may be deleted. Thus it may be understood that operation 206 and the actual operation according to the description regarding FIG. 4 are substantially similar.

Meanwhile, according to an example embodiment, the output of the system 410 for monitoring conversation input may be input to the system 420 for monitoring response information, or the output of the system 410 for monitoring conversation input may not be input to the system 410 for monitoring conversation input, and thus the scope of the present disclosure is not limited thereto.

According to an example embodiment, the electronic apparatus 110 may input the response information 321 to a model 430 for generating avatar motion information, and the model 430 for generating avatar motion information may generate avatar motion information based on the response information 321 and provide the avatar motion information to the user terminal 120. The model 430 for generating avatar motion information may correspond to a separate external apparatus distinct from the electronic apparatus 110, or may include an external apparatus. Alternatively, the model 430 for generating avatar motion information may be an internal element of the electronic apparatus 110 or a conceptual element for more conveniently explaining the operation of the electronic apparatus 110. In this case, the operation of the model 430 for generating avatar motion information may correspond to an operation of the electronic apparatus 110, and the input and output of the model 430 for generating avatar motion information may be understood as a process of data exchange inside the electronic apparatus 110.

According to an example embodiment, the electronic apparatus 110 may generate motion information of the avatar further based on the score information 311 in addition to the response information 321. However, even in this case, the motion information may be generated based on considering the response information 321 as a major factor while considering the score information 311 as a minor factor (e.g. considering the response information 321 more than the score information 311). In other words, the electronic apparatus 110 may generate motion information of the avatar in such a manner that the degree of association between the motion information and the response information 321 is greater than the degree of association between the motion information and the score information 311. This is to consider the fact that in the case of communication between people, the emotion revealed on the surface and the likeability level (and actual emotion) actually felt may be different.

According to an example embodiment, the model 430 for generating avatar motion information is learned based on data including "sentence-emoji" based on the XLM-T model, and thus an emoji according to a sentence included in the response information 321 or an emotion mapped to the emoji may be output, and motion information related thereto may be generated and provided. Further, if the response information 321 can be associated with a plurality of emotions (for example, a plurality of emotions such as happiness, surprise and anger), the model 430 for generating avatar motion information may select and output an emotion most directly related to the response information 321 (for example, if a probability value corresponding to each emotion can be derived, the emotion with the highest probability value), or may generate and provide motion information related to this. Further, the model 430 for generating avatar motion information may identify whether a probability value corresponding to an emotion with the highest probability exceeds a specific threshold value, and the model 430 for generating avatar motion information may output a corresponding emotion only when it exceeds the threshold value, or generate and provide motion information related thereto. In this case, if there is no probability value exceeding the threshold value, basic motion information that does not indicate a specific emotion may be displayed on the user terminal 120.

Meanwhile, since emoji and emotions can be mapped to each other, there is practically no big difference, but since text data combined with emoji is more common on the Internet than text data combined with emotion information, described is the method that the model 430 for generating avatar motion information is learned based on data having "sentence-emoji" and a mapping relationship between emoji and an emotion is additionally identified and the corresponding emotion is output. However, it is a mere example embodiment of the present disclosure, and thus the scope of the present disclosure is not limited thereto. Therefore, motion information may be provided according to various methods, such as learning the model 430 for generating avatar motion information based on data having "sentence-emotion" in the first place.

Avatar's motion information may be generated based on the response information 321 and the consistent conversation counterpart's attitude. Further, there may be various example embodiments related to generation of motion information of an avatar, such as that, according to an example embodiment, by the model 430 for generating avatar motion information receiving at least one of the score information 311 and the conversation history information 302, motion information of an avatar that more accurately reflects the conversation counterpart's attitude may be generated.

In the case of the first example embodiment 400, since the response information 321 is obtained first and the score information 311 is obtained based thereon, there is a difference in the order of human conversation, in which people listen to the other person's conversation, feel their emotions first, and then respond by reflecting the emotions. However, in a second example embodiment 500 and a third example embodiment 600 that will be described later, since the score information 311 is obtained first and the response information 321 is obtained based thereon, or since parameter information 611 corresponding to emotion is first obtained and the score information 311 and the response information 321 are obtained based thereon, the order of human conversations and the order may be matched.

However, in some environments where the service is provided, it is more effective in terms of the accuracy and promptness in providing the service to first obtain a response suitable for context and infer an emotion of a conversation counterpart based on the content of the response.

The descriptions related to the system 410 for monitoring conversation input, the system 420 for monitoring response information and the model 430 for generating avatar motion information of the first example embodiment 400 should be understood as generally applicable descriptions to various example embodiments according to the present disclosure. For example, in the second example embodiment 500 and the third example embodiment 600 to be described later, most of the descriptions related to the system 410 for monitoring conversation input, the system 420 for monitoring response information and the model 430 for generating avatar motion information described above may be applied mutatis mutandis. Some differences will be described later in FIG. 6.

Figure 5:
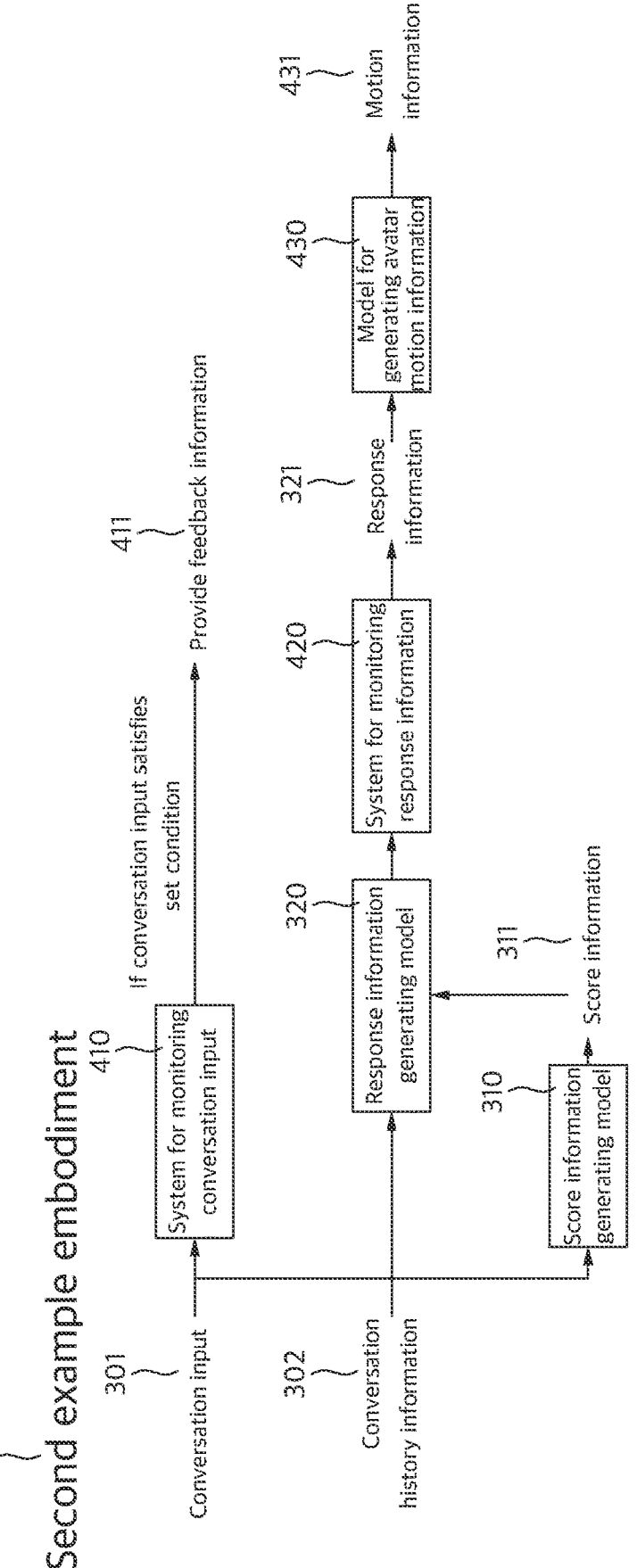
FIG. 5 is a diagram for explaining a second example embodiment related to a method for providing a conversation service by an electronic apparatus according to an example embodiment.

FIG. 5 is a diagram for explaining the second example embodiment related to a method for providing a conversation service by an electronic apparatus according to an example embodiment.

FIG. 5 illustrates the second example embodiment 500. The second example embodiment 500 may correspond to an example embodiment of obtaining the response information 321 based on the score information 311, and this may be more clearly understood by referring to the arrow pointing from reference numeral 311 to reference numeral 320.

The overall operation related to the second example embodiment 500 may be understood with application of the above descriptions with respect to FIGS. 2 to 4.

Figure 6:
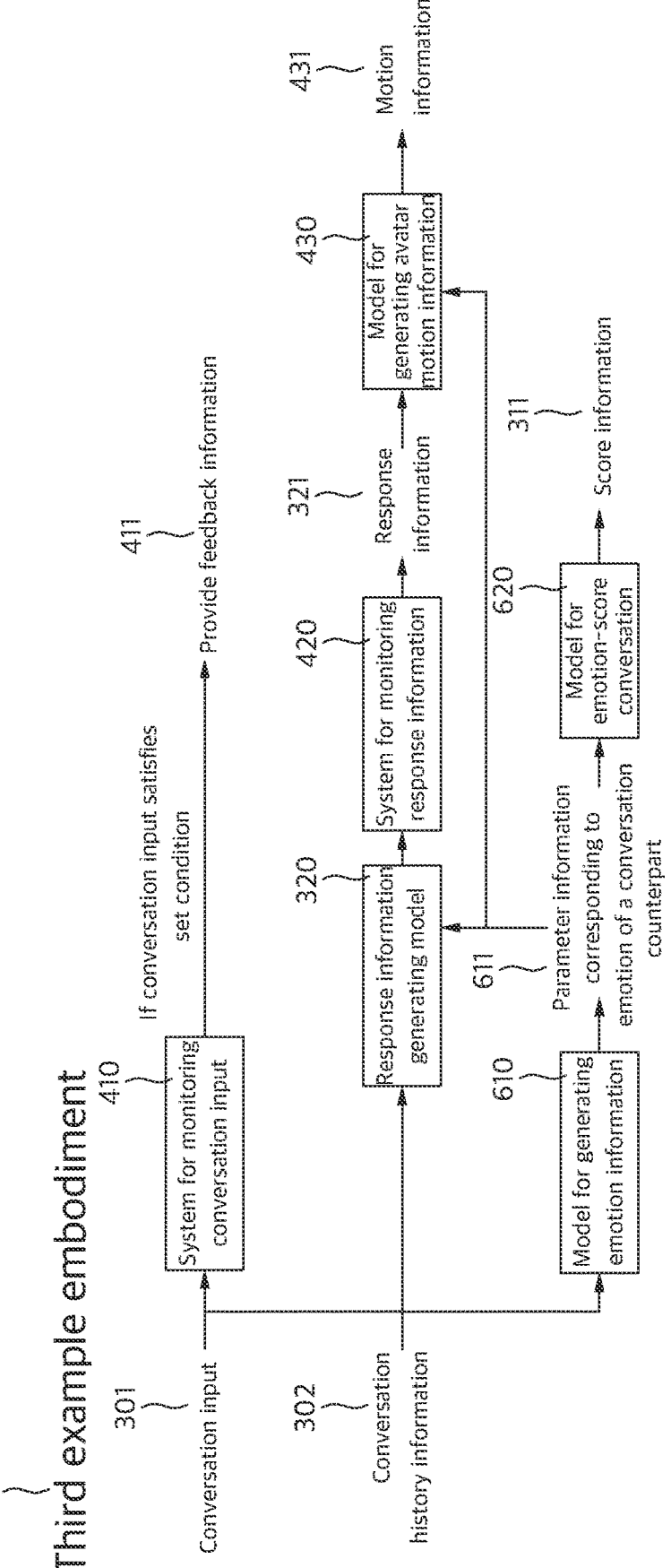
FIG. 6 is a diagram for explaining a third example embodiment related to a method for providing a conversation service by an electronic apparatus according to an example embodiment.

FIG. 6 is a diagram for explaining a third example embodiment related to a method for providing a conversation service by an electronic apparatus according to an example embodiment.

FIG. 6 illustrates the third example embodiment 600. The third example embodiment 600 may correspond to an example embodiment of obtaining the parameter information 611 corresponding to emotion of a conversation counterpart and based thereon obtaining the score information 311, the response information 321 and motion information 431. This may be understood more clearly by referring to the arrows pointing from reference numeral 611 to reference numeral 320, reference numeral 430 and reference numeral 620.

According to the third example embodiment 600, the electronic apparatus 110 may input at least one of the conversation input 301 and the conversation history information 302 to a model 610 for generating emotion information, and the model 610 for generating emotion information may generate the parameter information 611 corresponding to emotion of a conversation counterpart and provide the parameter information 611 to a model 620 for emotion-score conversation. The model 620 for emotion-score conversation may output the score information 311 by taking the parameter information 611 corresponding to emotion of a conversation counterpart as an input. The model 610 for generating emotion information and the model 620 for emotion-score conversation may correspond to a separate external apparatus distinct from the electronic apparatus 110, or may include an external apparatus. Alternatively, the model 610 for generating emotion information and the model 620 for emotion-score conversation may be internal elements of the electronic apparatus 110, or may be conceptual elements for more conveniently explaining the operations of the electronic apparatus 110. In this case, at least some of the operations of the model 610 for generating emotion information and the model 620 for emotion-score conversation correspond to operations of the electronic apparatus 110, and at least some of inputs and outputs of the model 610 for generating emotion information and the model 620 for emotion-score conversion may be understood as a process in which data is exchanged inside the electronic apparatus 110.

According to an example embodiment, the response information generating model 320 may further receive the parameter information 611 corresponding to emotion of a conversation counterpart, and based thereon, response information that more accurately reflects the conversation counterpart's emotional state may be generated. According to an example embodiment, the model 430 for generating avatar motion information may further receive the parameter information 611 corresponding to emotion of the conversation counterpart, and based thereon, avatar motion information that more accurately reflects the conversation counterpart's emotional state may be generated.

In the third example embodiment 600, the parameter information 611 corresponding to emotion of the conversation counterpart may more specifically reflect human emotion (for example, human emotions that can be both happy and angry, and happy and displeased, and so on) in which various elements are combined, unlike using emotions and score information separately, or unlike the score information, which simply reflects numerical highs and lows.

Further, for communication between people, the feelings expressed in the sentences spoken outwardly and the score (for example, likeability level) for the opponent inwardly thought may differ from each other (for example, a person may say "I'm fine . . . haha." but he/she is actually not okay), and in the third example embodiment 600, such differences may be more accurately reflected.

Furthermore, even if a person feels negative emotions during a conversation, the likeability level toward a conversation counterpart may increase (for example, if a person tells a sad story and a conversation counterpart sympathizes with the person, the emotion the person feels itself may be negative but likeability level toward the conversation counterpart may change in a positive direction), and in the third example embodiment 600, such differences may be more accurately reflected.

The first example embodiment 400, the second example embodiment 500 and the third example embodiment 600 described above are only example embodiments for more conveniently describing various example embodiments related to the present disclosure. The scope of the present disclosure is not limited thereto. For example, according to an example embodiment, the electronic apparatus 110 may obtain the response information 321 based on the parameter information 611 corresponding to emotion of the conversation counterpart, but alternatively, the electronic apparatus 110 may obtain the score information 311 based on the response information 321, the conversation input 301 and the conversation history information 302 (in other words, in the case of the score information 311, the parameter information 611 corresponding to emotion of the conversation counterpart may not be considered).

Figure 7:
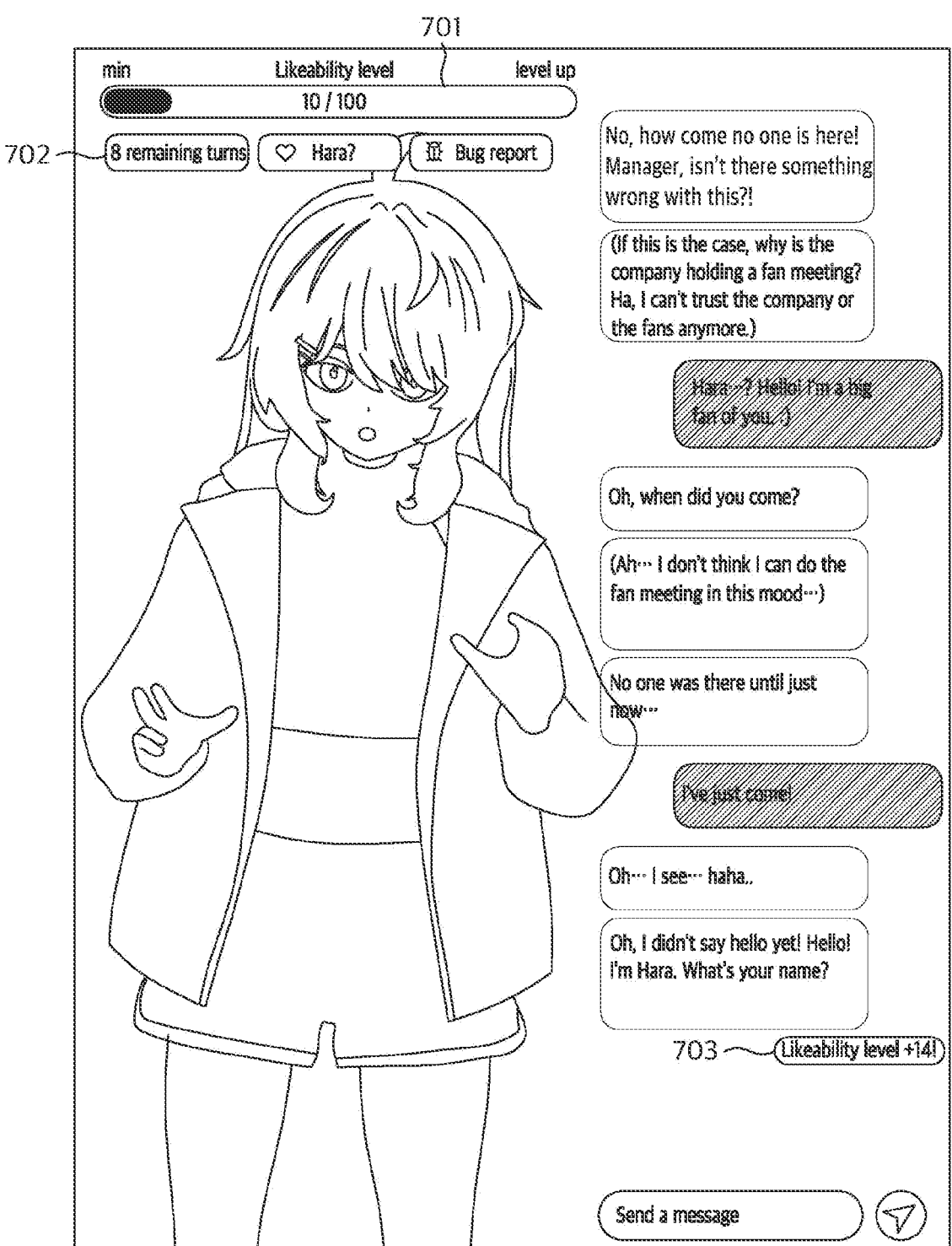
FIG. 7 is a diagram for explaining information displayed on a user terminal in relation to a conversation service provided according to an example embodiment.

FIG. 7 is a diagram for explaining information displayed on a user terminal in relation to a conversation service provided according to an example embodiment.

FIG. 7 illustrates a screen displayed on the user terminal 120 as illustrated in reference numeral 700. More specifically, as information corresponding to the above-described "score information," likeability level information 701 may correspond to the score information obtained in response to the current conversation input, or may correspond to a value obtained by accumulating score information obtained according to previous conversation histories. Further, the likeability level information 701 may further include target score information to be obtained through a series of conversation processes, and in the example embodiment illustrated in FIG. 7, the target score is 100 points and the score obtained by a user is 10 points.

Further, the number of remaining turns as illustrated in reference numeral 702 may correspond to information related to remaining conversation input opportunities. However, according to an example embodiment, even if the number of remaining turns elapses, if a set condition such as achieving a target score is satisfied, the conversation may continue to the next conversation phase without ending.

Meanwhile, at least a part of series of conversation contents (in other words, user's conversation inputs and response information obtained by the electronic apparatus 110) exchanged between the user and the conversation counterpart may be displayed on a part of the screen, and score information that is reflected in real time may be further displayed so that the user may identify whether the user's conversation input is appropriate in real time (please refer to reference numeral 703).

Figure 8:
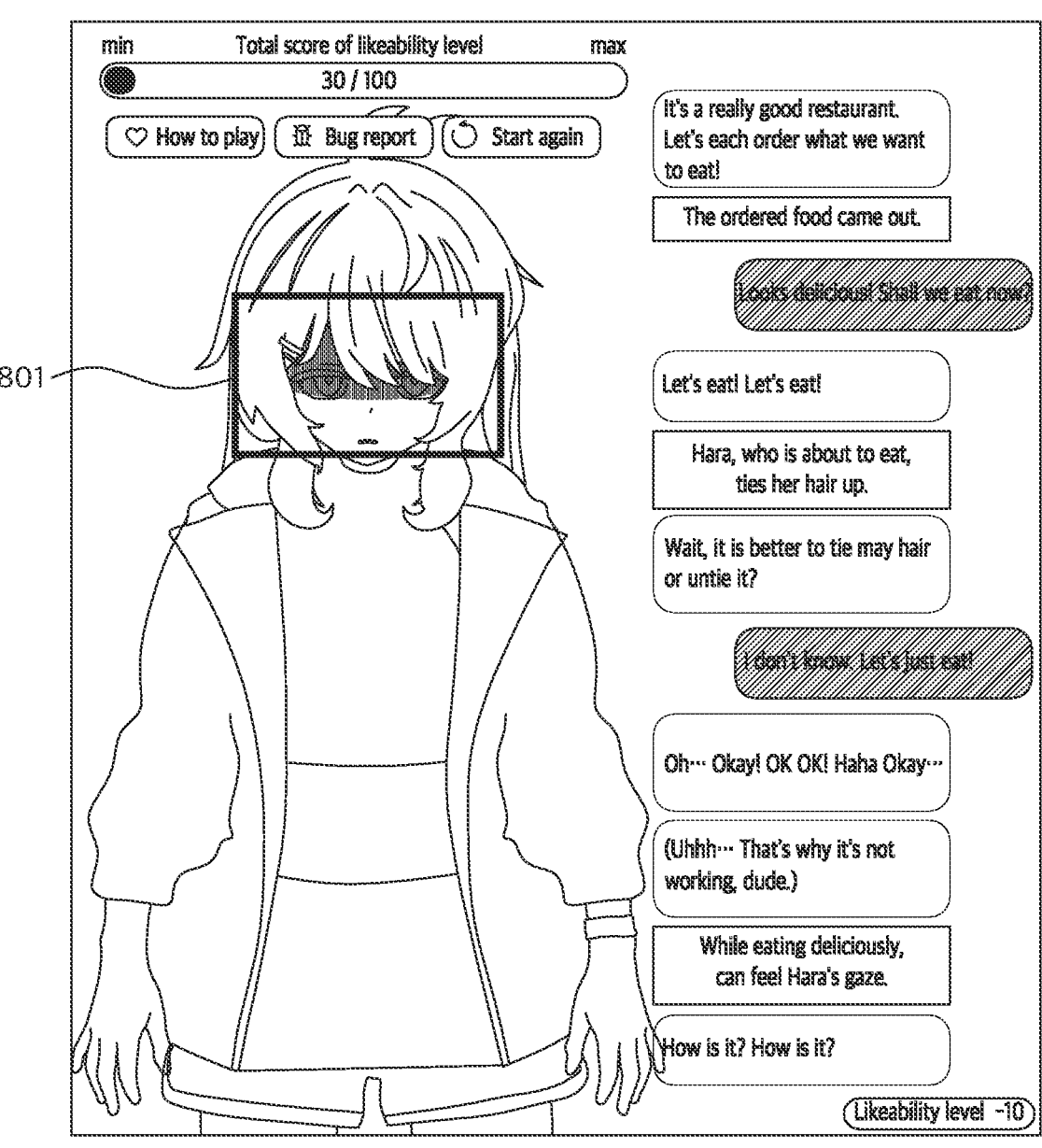
FIG. 8 is a diagram for explaining an operation of providing motion information of an avatar corresponding to a user's conversation counterpart to a user terminal according to an example embodiment.

FIG. 8 is a diagram for explaining an operation of providing motion information of an avatar corresponding to a user's conversation counterpart to a user terminal according to an example embodiment.

Referring to FIG. 8, since the motion information of the avatar corresponding to the conversation counterpart is displayed on the user terminal 120, the user may more intuitively identify the conversation counterpart's emotion and attitude. For example, a facial expression reflecting the negative emotions of the avatar may be displayed on the user terminal 120 as indicated in reference numeral 801. According to an example embodiment, motion information of the avatar may be provided based on the score information corresponding to a recent conversation input. For example, the score information corresponding to the recent input "I don't know. Let's eat first" is "Likeability level –10" and thus negative motion information reflecting the negative emotion of the avatar may be displayed on the user terminal 120. According to an example embodiment, motion information of the avatar may be provided based on cumulative score information. For example, compared to the target likeability level of 100 points, the accumulated likeability level 30 points is considerably low, and thus reflecting the low likeability level, negative motion information of the avatar may be displayed on the user terminal 120. According to an example embodiment, the motion information of the avatar may be provided based on the parameter information corresponding to the emotion of the conversation counterpart (please refer to the parameter information corresponding to emotion of the conversation counterpart 611 of FIG. 6). For example, if the avatar's current emotion corresponds to a combination of "irritated," "depressed" and "disappointed," negative motion information of the avatar reflecting the combined emotion may be displayed on the user terminal 120.

FIG. 8 illustrates an example in which the avatar's facial expression changes, but in addition thereto, there may be various example embodiments related to the specific form of motion information of the avatar, such as a case where the avatar takes a specific action (for example, crossing arms or scratching the head) and a case of outputting a specific emoji.

Figure 9:
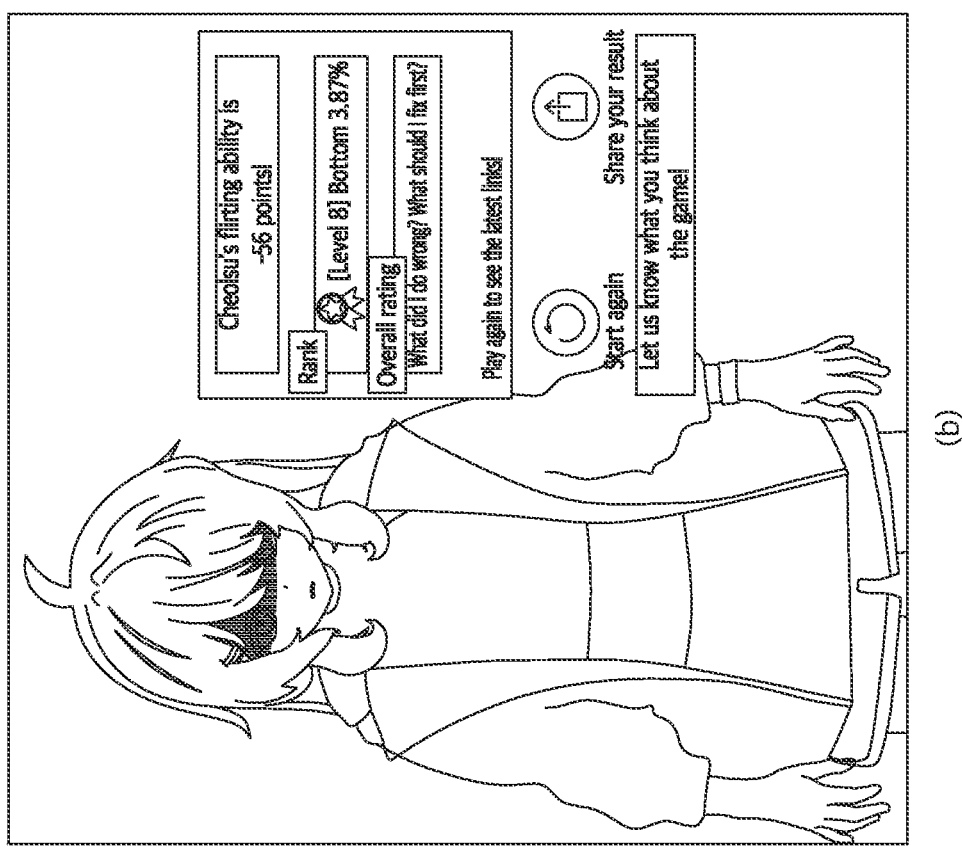
FIG. 9 is a diagram for explaining an operation of providing a user terminal with a result of using a conversation service according to an example embodiment.
Figure 9:
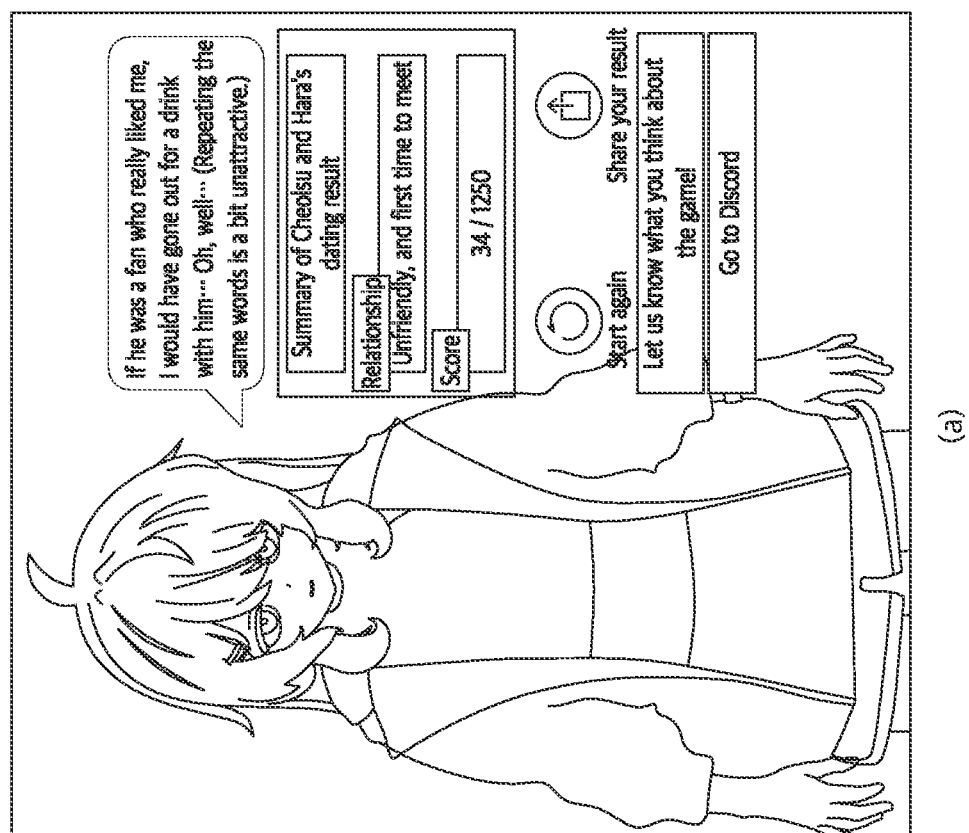

FIG. 9 is a diagram for explaining an operation of providing a user terminal with a result of using a conversation service according to an example embodiment.

Referring to FIG. 9, the electronic apparatus 110 may determine whether or not to continue a conversation with the user based on the score information, and when it is determined not to continue the conversation, a result of using the conversation service may be provided to the user terminal 120.

For example, if the conversation service provided by the electronic apparatus 110 corresponds to a conversational game service, the electronic apparatus 110 may determine whether to proceed to the next stage associated with the game service based on the score information. In an example embodiment, if a target score to achieve in the current stage is 100 points, all given turns in the current stage are elapsed, so there are no more conversation opportunities and the accumulated score is only 85 points, which falls short of the target score, the electronic apparatus 110 may determine not to proceed to the next stage (in other words, not to continue the conversation).

Further, in addition to ending the conversation based on the score information, in various cases such as when all prepared conversation content is consumed or when the user requests termination of the conversation service, the electronic apparatus 110 may provide the user terminal 120 with a result of using the conversation service.

FIGS. (a) and (b) of FIG. 9 may be examples of screens on which a result of using the conversation service is displayed on the user terminal 120. The screen displayed on the user terminal 120 may include information such as a conversation counterpart's comment related to the result of using the conversation service and a summary (relationship information, score information, rank information and overall rating information and so on) of the result of using the conversation service. According to an example embodiment, motion information of the avatar may be further included, but the score of the present disclosure is not limited to the example embodiments.

Further, according to an example embodiment, the electronic apparatus 110 may not end the conversation even if the score information falls short of the target score. In this case, based on the score information, a next stage related to the progress of the conversation may be divided. According to an example embodiment, a progress direction of the conversation service may be set in a manner that if the score information reaches the target score, the stage of dating with the conversation counterpart proceeds, and if the score information does not reach the target score, the stage of encountering with the conversation counterpart by change proceeds.

In addition, there may be various example embodiments related to the present disclosure such as an example embodiment in which a plurality of target points are set, and whether to divide the conversation stage or end the conversation is set differently for each target score. For example, the progress direction of the conversation service may be set in a manner that if the score information reaches the first target score, a stage of dating with the conversation counterpart proceeds, if the score information does not reach the first target score but reaches a second target score, the stage of encountering the conversation counterpart by chance proceeds, and if the score information does not reach the second target score, the conversation is terminated.

Figure 10:
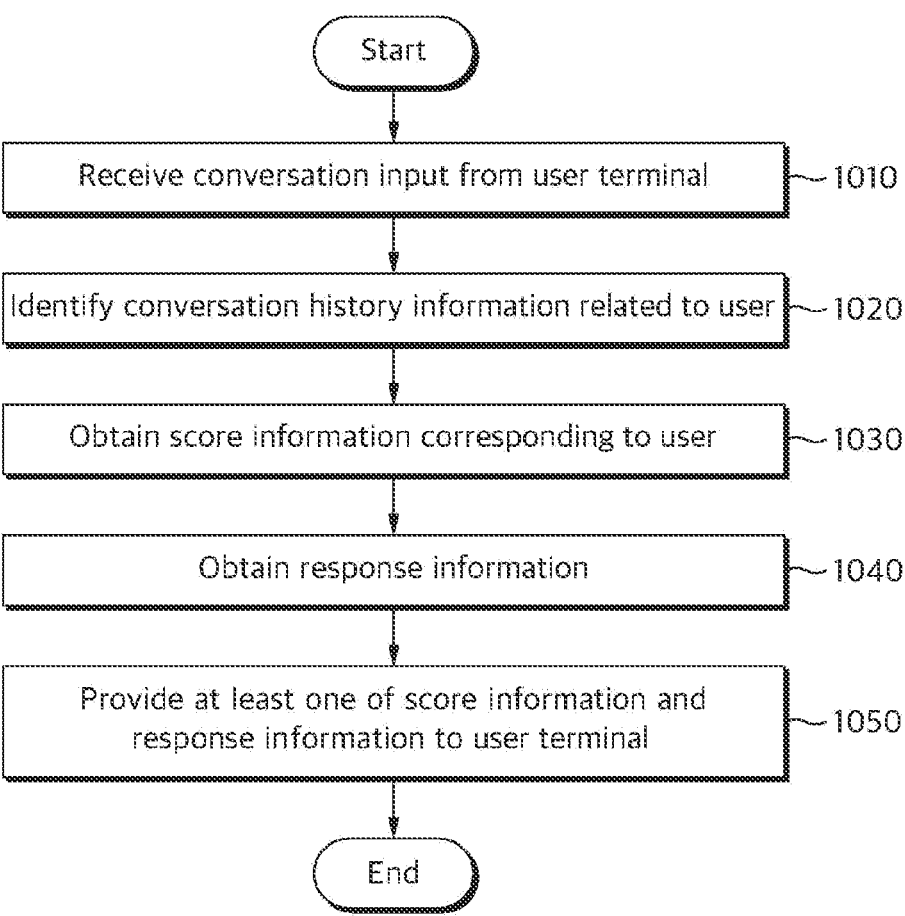
FIG. 10 is an operation flowchart of a method of providing a conversation service of an electronic apparatus according to an example embodiment.

FIG. 10 is an operation flowchart of a method of providing a conversation service of an electronic apparatus according to an example embodiment.

Referring to FIG. 10, in operation 1010, the electronic apparatus 110 receives a conversation input from the user terminal 120, and in operation 1020, the electronic apparatus 110 identifies conversation history information related to the user. The conversation input may include at least one of a user's input for selecting one option among a plurality of conversation options displayed on the terminal and a text input entered by the user for the conversation. The conversation history information may include a history of conversations exchanged between the user and the conversation counterpart (a virtual counterpart that utters the response information that is obtained by the electronic apparatus 110) on the conversation service provided by the electronic apparatus 110.

In operation 1030, based on the conversation input and the conversation history information, the electronic apparatus 110 obtains the score information corresponding to the user. Further, in operation 1040, based on the conversation input and the conversation history information, the electronic apparatus 110 obtains response information for the received conversation input. The score information may include information obtained by scoring emotions and likeability level that the conversation counterpart feels in relation to the user's conversation input. The response information may include utterance contents of the conversation counterpart that identified (a wide range of operations for receiving information, such as listening or reading, may be included) the user's conversation input.

Operation 1030 and operation 1040 may be performed concurrently, or operation 1040 may be performed prior to operation 1030, and accordingly, whether or not the operations are simultaneously performed and the precedence relationship may be variously determined.

In operation 1050, the electronic apparatus 110 provides at least one of the score information and the response information to the user terminal 120. According to an example embodiment, the electronic apparatus 110 may further provide various types of information. For example, the electronic apparatus 110 may generate and provide avatar motion information, or the electronic apparatus 110 may determine whether or not to continue a conversation with the user and provide information about a result of the determination.

Figure 11:
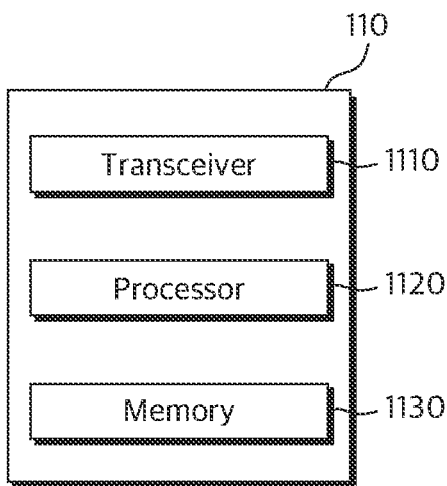
FIG. 11 is an exemplary diagram of the configuration of an electronic apparatus for providing a conversation service according to an example embodiment.

FIG. 11 is an exemplary diagram of the configuration of an electronic apparatus for providing a conversation service according to an example embodiment.

Referring to FIG. 11, the electronic apparatus 110 includes a transceiver 1110, a processor 1120 and a memory 1130. The electronic apparatus 110 may be connected to the user terminal 120 and other external apparatuses (for example, the score information generating model 310 and the response information generating model 320) through the transceiver 1110 and exchange data.

The processor 1120 may include at least one of the apparatuses described above with reference to FIGS. 1 to 10, or may perform at least one method described above through FIGS. 1 to 10. The memory 1130 may store information for performing at least one method described above through FIGS. 1 to 10. The memory 1130 may be volatile memory or non-volatile memory.

The processor 1120 may control the electronic apparatus 110 for executing a program and providing information. Program codes executed by the processor 1120 may be stored in the memory 1130.

Further, the electronic apparatus 110 according to an example embodiment may further include an interface that provides information to a user.

Meanwhile, in the present disclosure and drawings, example embodiments are disclosed, and certain terms are used. However, the terms are only used in general sense to easily describe the technical content of the present disclosure and to help the understanding of the present disclosure, but not to limit the scope of the present disclosure. It is apparent to those of ordinary skill in the art to which the present disclosure pertains that other modifications based on the technical spirit of the present disclosure may be implemented in addition to the example embodiments disclosed herein.

The electronic apparatus or terminal according to the above-described example embodiments may include a processor, a memory for storing and executing program data, a permanent storage such as a disk drive, and/or a user interface apparatus such as a communication port, a touch panel, a key and/or a button that communicates with an external apparatus. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control apparatuses. Similar to that elements may be implemented as software programming or software elements, the example embodiments may be implemented in a programming or scripting language such as C, C++, Java, assembler, Python, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

What is claimed is:

1. A method of providing a conversation service in an electronic apparatus, the method comprising:

receiving a conversation input from a user terminal;

determining whether the conversation input satisfies a set condition;

when the conversation input satisfies the set condition, providing the user terminal with feedback information related to the conversation input;

identifying conversation history information associated with a user of the user terminal;

obtaining score information corresponding to the user based on the conversation input and the conversation history information, wherein the electronic apparatus obtains the score information further based on whether the conversation input satisfies the set condition;

obtaining response information based on the conversation input and the conversation history information; and providing the user terminal with at least one of the score information and the response information.

2. The method of claim 1, wherein the electronic apparatus obtains the score information further based on the response information.

3. The method of claim 1, wherein the electronic apparatus obtains the response information further based on the score information.

4. The method of claim 1, further comprising:

based on the conversation input and the conversation history information, obtaining parameter information corresponding to an emotion of a conversation counterpart of the user, wherein the electronic apparatus obtains the score information and the response information further based on the parameter information corresponding to the emotion.

5. The method of claim 1, wherein the obtaining the score information includes:

providing a set model with the conversation input and an input including the conversation history information; and obtaining an output from the model in response to the conversation input and the input including the conversation history information.

6. The method of claim 5, wherein the output of the model is determined according to a manner in which the model is set, wherein the manner in which the model is set includes a manner related to how learning data for setting the model is labeled.

7. The method of claim 1, further comprising:

based on at least one of the response information and the score information, obtaining motion information of an avatar corresponding to a conversation counterpart of the user; and providing the motion information to the user terminal.

8. The method of claim 7, wherein the electronic apparatus obtains the motion information in such a manner that a degree of association between the motion information and the response information is greater than a degree of association between the motion information and the score information.

9. The method of claim 1, further comprising:

based on the score information, determining whether to continue a conversation with the user.

10. The method of claim 9, wherein the conversation service includes a conversation type game service, and wherein the determining whether to continue the conversation with the user includes determining whether to proceed to a next stage associated with the game service based on the score information.

11. The method of claim 1, wherein the conversation history information includes historic score information corresponding to the user, wherein the historic score information is previously obtained based on at least one previous conversation.

12. The method of claim 1, wherein the determining whether the conversation input satisfies the set condition includes at least one of:

identifying whether the conversation input includes a set keyword; or identifying whether the conversation input belongs to a set category.

13. The method of claim 1, wherein a method of using the conversation history information to obtain the score information and a method of using the conversation history information to obtain the response information are different from each other.

14. A computer-readable non-transitory recording medium having a program for executing the method of claim 1 on a computer.

15. An electronic apparatus of providing a conversation service, comprising:

a transceiver;

a memory configured to store instructions; and a processor, wherein the processor, connected to the transceiver and the memory, is configured to receive a conversation input from a user terminal;

determine whether the conversation input satisfies a set condition;

when the conversation input satisfies the set condition, provide the user terminal with feedback information related to the conversation input;

identify conversation history information associated with a user of the user terminal;

obtain score information corresponding to the user based on the conversation input and the conversation history information, wherein the electronic apparatus obtains the score information further based on whether the conversation input satisfies the set condition;

obtain response information based on the conversation input and the conversation history information; and provide the user terminal with at least one of the score information and the response information.

16. The electronic apparatus of claim 15, wherein the processor obtains the score information further based on the response information.

17. The electronic apparatus of claim 15, wherein the processor obtains the response information further based on the score information.

18. The electronic apparatus of claim 15, wherein:

based on the conversation input and the conversation history information, the processor obtains parameter information corresponding to an emotion of a conversation counterpart of the user, and the processor obtains the score information and the response information further based on the parameter information corresponding to the emotion.

19. The electronic apparatus of claim 15, wherein, in order to obtain the score information, the processor is configured to:

provide a set model with the conversation input and an input including the conversation history information; and obtain an output from the model in response to the conversation input and the input including the conversation history information.

20. The electronic apparatus of claim 15, wherein the processor is further configured to:

based on at least one of the response information and the score information, obtain motion information of an avatar corresponding to a conversation counterpart of the user; and provide the motion information to the user terminal.

21. The electronic apparatus of claim 15, wherein the processor is further configured to:

based on the score information, determine whether to continue a conversation with the user.

22. The electronic apparatus of claim 21, wherein the conversation service includes a conversation type game service, and wherein, in order to determine whether to continue the conversation with the user, the processor is configured to: determine whether to proceed to a next stage associated with the game service based on the score information.

\* \* \* \* \*